United States Patent
Yoshikawa et al.

(10) Patent No.: US 12,427,982 B2
(45) Date of Patent: Sep. 30, 2025

(54) VEHICLE CONTROL DEVICE

(71) Applicant: HONDA MOTOR CO., LTD., Tokyo (JP)

(72) Inventors: Fumiaki Yoshikawa, Tokyo (JP); Hisanori Yanagida, Tokyo (JP); Takashi Watanabe, Tokyo (JP); Satoshi Matsushita, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 180 days.

(21) Appl. No.: 18/455,670

(22) Filed: Aug. 25, 2023

(65) Prior Publication Data
US 2024/0067177 A1    Feb. 29, 2024

(30) Foreign Application Priority Data
Aug. 31, 2022   (JP) .................. 2022-138109

(51) Int. Cl.
*B60W 30/14* (2006.01)
*B60W 50/02* (2012.01)
*B60W 50/14* (2020.01)

(52) U.S. Cl.
CPC .......... *B60W 30/146* (2013.01); *B60W 50/02* (2013.01); *B60W 50/14* (2013.01); *B60W 2520/00* (2013.01); *B60W 2520/14* (2013.01)

(58) Field of Classification Search
CPC .... B60W 30/146; B60W 50/02; B60W 50/14; B60W 2520/00; B60W 2520/14;
(Continued)

(56) References Cited

U.S. PATENT DOCUMENTS

| | | | |
|---|---|---|---|
| 2003/0028310 A1* | 2/2003 | Schmitz | B60K 31/04 701/93 |
| 2006/0258508 A1* | 11/2006 | Tanioka | B60R 25/04 477/203 |

(Continued)

FOREIGN PATENT DOCUMENTS

JP    2013-130130 A    7/2013

*Primary Examiner* — Jason Holloway
*Assistant Examiner* — Madison B Emmett
(74) *Attorney, Agent, or Firm* — Carter, DeLuca & Farrell LLP (57) ABSTRACT

A vehicle control device includes: an accelerator pedal operation detecting unit, a state quantity acquiring devices, and a driving force limiting unit that limits a driving force based on an accelerator pedal operation and a vehicle state quantity. The driving force limiting unit executes acceleration suppression control for setting an upper limit value of the driving force to a first limit value when a sudden accelerator pedal operation is detected, executes limited acceleration suppression control for setting the upper limit to a second limit value larger than the first limit value when the accelerator pedal is continuously depressed or depressed again within a predetermined time after the accelerator pedal is returned during execution of the acceleration suppression control, and switches the upper limit value according to the abnormality-occurring state quantity acquiring device when the abnormality has occurred in the state quantity acquiring devices during execution of these controls.

9 Claims, 7 Drawing Sheets

(58) Field of Classification Search
CPC ....... B60W 2050/0215; B60W 50/038; B60W 2520/10; B60W 2540/10; B60W 2540/106; B60W 2720/106; B60W 30/18; B60W 2050/143; B60W 2050/146; B60W 2520/105; B60W 2520/28; B60W 2540/16

See application file for complete search history.

(56) References Cited

U.S. PATENT DOCUMENTS

| | | | |
|---|---|---|---|
| 2012/0209488 A1* | 8/2012 | Nagaya | B60W 10/06 701/70 |
| 2013/0015929 A1* | 1/2013 | Bryan | B60Q 11/005 335/7 |
| 2013/0166162 A1 | 6/2013 | Minase et al. | |
| 2014/0155223 A1* | 6/2014 | Suzuki | B60W 10/04 477/97 |
| 2015/0307091 A1* | 10/2015 | Gokan | G01S 7/539 701/70 |
| 2016/0281620 A1* | 9/2016 | Nakade | F02D 41/10 |
| 2017/0197619 A1* | 7/2017 | Kelly | B60W 10/04 |
| 2020/0307581 A1* | 10/2020 | Shimbo | B60W 30/09 |
| 2023/0174064 A1* | 6/2023 | Kinoto | B60W 10/18 701/70 |
| 2023/0256966 A1* | 8/2023 | Kim | B60W 50/14 701/93 |
| 2024/0336261 A1* | 10/2024 | Jeong | B60W 30/18163 |
| 2025/0074392 A1* | 3/2025 | Bulkley | B60W 10/08 |

\* cited by examiner

VEHICLE CONTROL DEVICE

TECHNICAL FIELD

The present invention relates to a vehicle control device that limits a driving force according to a state quantity of a vehicle.

RELATED ART

In these years, efforts are actively taken to provide access to a sustainable transportation system in consideration of vulnerable people such as elderly people, disabled people, and children among traffic participants. In order to achieve this, focus is given on research and development for further improving safety and convenience of traffic through developments related to improvements of behavior stability of vehicles.

As one of the developments related to the behavior stability of the vehicles, there is a known technique of controlling a braking or driving force of the vehicle in order to avoid sudden acceleration resulting from an erroneous operation or the like of a driver under a low-speed driving condition such as the time of starting or stopping the vehicle. In such a technique of controlling a braking or driving force according to a state of the vehicle, it is extremely important to take measures such that the braking or driving force can be appropriately controlled and safety of the vehicle can be ensured even in a case where an abnormality occurs in a sensor that detects a state quantity of the vehicle, a communication system that transmits a detected signal, or the like and the state of the vehicle cannot be accurately grasped.

For example, JP 2013-130130 A discloses a drive control device that executes a driving force limitation process for suppressing a driving force output from an internal combustion engine when a shift lever is switched from a non-driving position (parking position or neutral position) to a reverse position in a state where an accelerator operation member is turned on.

In this drive control device, when an abnormality occurs in a sensor or wiring for detecting a shift position, it is determined whether or not the vehicle is traveling forward based on a gear position of an automatic transmission, and whether or not to execute the driving force limitation process is determined based on the determination (first embodiment). In another aspect, when an abnormality occurs in the sensor or the wiring, execution of the driving force limitation process is prohibited, and when the abnormality occurs during execution of the driving force limitation process, the execution of the driving force limitation process is maintained until an on-operation of the accelerator operation member by a driver is canceled (second embodiment). In addition, in still another aspect, even in a case where an abnormality has occurred in the sensor or the wiring, the driving force limitation process is executed all the time when the accelerator operation member is operated (third embodiment).

CITATION LIST

Patent Literature

Patent Literature 1: JP 2013-130130 A

SUMMARY

In the technique described in JP 2013-130130 A, whether or not to execute the driving force limitation process is determined only based on a fact that the shift position is in the R range and presence or absence of the accelerator operation. However, in order to appropriately avoid danger due to sudden acceleration caused by an erroneous operation or the like, it is desirable to appropriately limit the driving force not only when the shift position is in the R range but also when the shift position is in a shift range for forward travel such as the D range. In addition, in order to avoid that the driving force limitation is not executed even in a situation in which the driving force limitation is necessary, or that the driving force is excessively limited in a situation in which the driving force limitation is unnecessary, it is desirable to monitor various state quantities of the vehicle and to determine whether or not the driving force limitation should be executed and how the driving force limitation should be executed based on the state quantities.

As described above, in a case where the driving force is limited according to a state quantity of the vehicle under a wider range of driving conditions, in order to ensure safety when an abnormality occurs in a sensor or the like that detects the state quantity of the vehicle, it is necessary to execute finer control according to a type of the abnormality, a driving condition when the abnormality occurs, and the like.

The present invention has been made in order to solve such a problem, and an object of the present invention is to provide a vehicle control device capable of safely continuing control of driving force limitation even in a case where an abnormality has occurred. In addition, the present invention contributes to development of a sustainable transportation system.

In order to achieve this object, a vehicle control device according to a first aspect of the present invention includes: an accelerator pedal operation detecting unit (an ECU 2 and an accelerator pedal sensor 31 in an embodiment (hereinafter, the same applies in this section)) that detects an accelerator pedal operation of a vehicle and acquires an accelerator opening degree AP or an accelerator pedal depression speed ΔAP; a plurality of state quantity acquiring devices 3 that acquires a vehicle state quantity indicating various state quantities of the vehicle; and a driving force limiting unit 21 that limits a driving force of the vehicle based on the accelerator pedal operation and the vehicle state quantity, in which the driving force limiting unit 21 executes acceleration suppression control for setting an upper limit value of the driving force of the vehicle to a predetermined first limit value APlim1 (step 204 in FIG. 2 and step 401 in FIG. 4) in a case where the accelerator opening degree AP exceeds a predetermined threshold opening degree APthr or in a case where the accelerator pedal depression speed ΔAP exceeds a predetermined threshold speed ΔAPthr (step 202 in FIG. 2 and steps 302 and 303 in FIG. 3), executes limited acceleration suppression control for setting the upper limit value of the driving force of the vehicle to a second limit value APlim2 larger than the first limit value APlim1 (step 208 in FIG. 2 and step 604 in FIG. 6) in a case where the accelerator pedal is continuously depressed for a predetermined time or more or in a case where the accelerator opening degree AP exceeds the threshold opening degree APthr or the accelerator pedal depression speed ΔAP exceeds the threshold speed ΔAPthr within a predetermined time after the depression of the accelerator pedal is returned to a predetermined value (step 205 in FIG. 2 and steps 501 and 502 in FIG. 5), during execution of the acceleration suppression control, and switches the upper limit value of the driving force of the vehicle according to the state quantity acquiring device in which an abnormality has occurred (step 210 in FIG. 2 and FIG. 7) until the depression of the accelerator pedal is returned to the predetermined value in a case where the abnormality has occurred in at least one of the state quantity acquiring devices during execution of the acceleration suppression control or the limited acceleration suppression control (step 209 in FIG. 2).

In a case where an accelerator opening degree equal to or more than a predetermined value or an accelerator pedal depression speed equal to or more than a predetermined value is acquired, this vehicle control device determines that a driver has performed a sudden accelerator pedal operation, and executes acceleration suppression control for setting an upper limit value of a driving force to a first limit value. In addition, in a case where an accelerator pedal is continuously depressed for a predetermined time or more or the accelerator pedal is depressed again strongly within a predetermined time after depression of the accelerator pedal is once loosened during execution of the acceleration suppression control, the vehicle control device executes limited acceleration suppression control for setting the upper limit value of the driving force to a second limit value larger than the first limit value in consideration of a possibility that the accelerator pedal operation by the driver is not due to an erroneous operation but due to an acceleration intention. In this way, by shift from the acceleration suppression control to the limited acceleration suppression control according to an operation of the driver while preventing sudden acceleration due to an erroneous operation of the driver by the acceleration suppression control, the limitation of the driving force is loosened, and drivability can be thereby improved.

In addition, in a case where an abnormality has occurred in the state quantity acquiring devices during execution of the acceleration suppression control or the limited acceleration suppression control, the upper limit value of the driving force of the vehicle is switched according to the state quantity acquiring device in which the abnormality occurs until depression of the accelerator pedal by the driver is loosened. That is, in a case where an abnormality has occurred in the state quantity acquiring device, it is possible to appropriately control the driving force of the vehicle according to the type and content of the abnormality instead of immediately canceling the limitation of the driving force or simply maintaining the control being executed until the accelerator pedal operation is canceled. Therefore, it is possible to provide a vehicle control device capable of safely continuing control of the driving force limitation even in a case where an abnormality has occurred.

Figure 2:
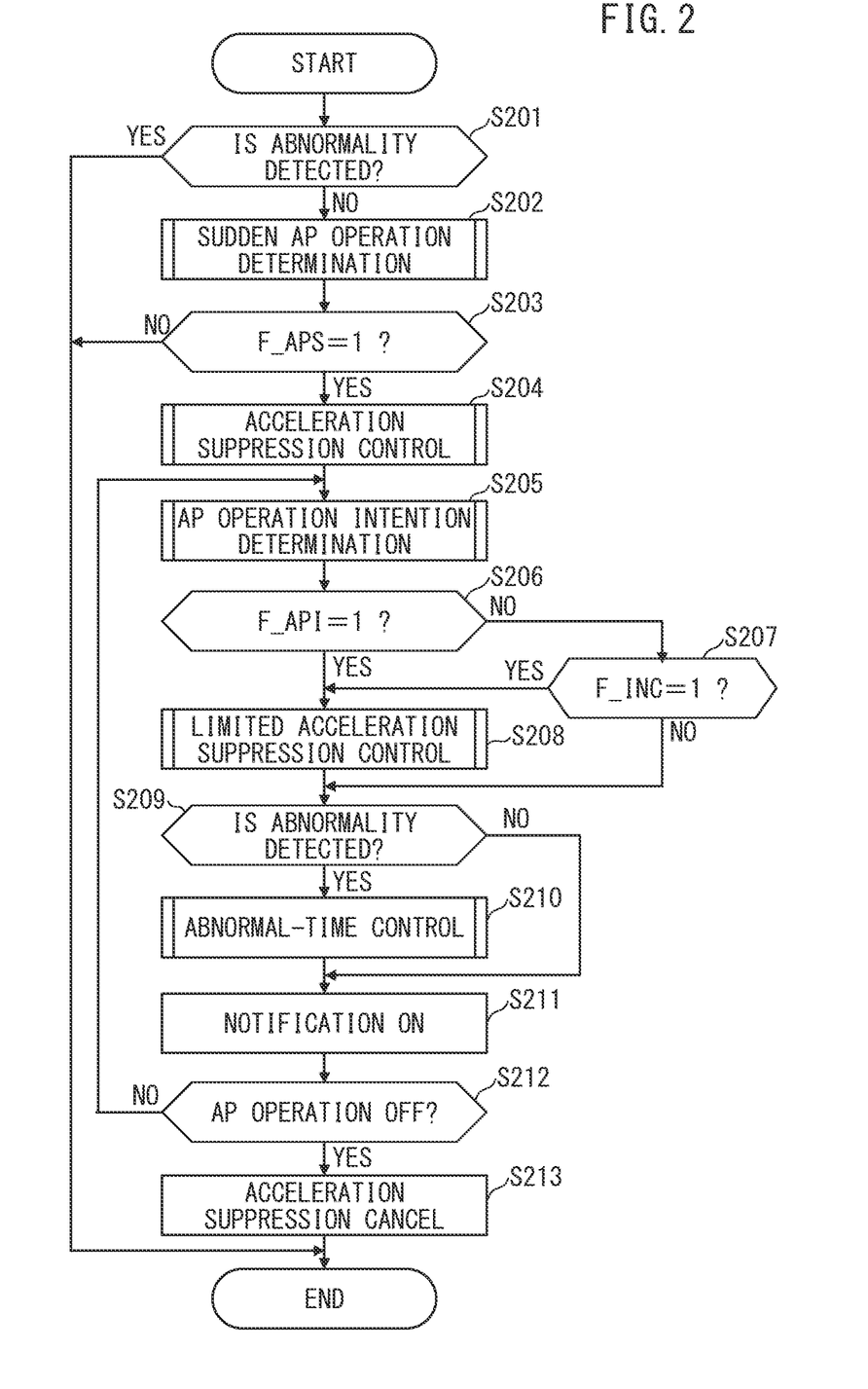
FIG. 2 is a flowchart illustrating a control process of driving force limitation in the vehicle control device according to one embodiment of the present invention.

According to a second aspect of the present invention, in the vehicle control device described in the first aspect, in a case where an abnormality has occurred in at least one of the state quantity acquiring devices 3 during execution of the acceleration suppression control or the limited acceleration suppression control, the driving force limiting unit 21 prohibits execution of the acceleration suppression control and the limited acceleration suppression control (step 201 in FIG. 2) after depression of the accelerator pedal is returned to the predetermined value (steps 212 and 213 in FIG. 2).

According to this configuration, in a case where an abnormality has occurred in the state quantity acquiring device during execution of the acceleration suppression control or the limited acceleration suppression control, execution of the acceleration suppression control and the limited acceleration suppression control is prohibited after depression of the accelerator pedal by the driver is loosened. Therefore, it is possible to avoid occurrence of an unexpected situation by limiting the driving force under a situation where some of the state quantities of the vehicle are unknown or reliability of information thereof decreases, and to improve safety of the vehicle.

According to a third aspect of the present invention, in the vehicle control device described in the first aspect, the state quantity acquiring devices 3 acquire gradient information indicating a gradient of a traveling path of the vehicle and vehicle speed-related information indicating a vehicle speed which is a speed of the vehicle, and the driving force limiting unit 21 sets an upper limit value of the driving force of the vehicle according to the gradient and the vehicle speed (steps 207 and 208 in FIG. 2) in a case where a gradient equal to or more than a predetermined value is acquired and the vehicle speed is equal to or less than a predetermined value (steps 402 and 403 in FIG. 4) during execution of the acceleration suppression control.

According to this configuration, in a case where the gradient of the traveling path of the vehicle is equal to or more than a predetermined value and the vehicle speed is equal to or less than a predetermined value, the upper limit value of the driving force of the vehicle can be set according to the gradient and the vehicle speed. Therefore, for example, in a traveling path with a large gradient, in a case where the vehicle speed is equal to or less than a predetermined value and an unintentional movement (descending) backward is likely to occur, control of the driving force limitation can be set so as to be switched from the acceleration suppression control to the limited acceleration suppression control with looser limitation. As described above, by executing control of the driving force limitation according to the gradient of the traveling path and the vehicle speed, the driving force can be appropriately controlled so as to prevent descending of the vehicle even in a case where an abnormality has occurred in the state quantity acquiring devices.

According to a fourth aspect of the present invention, in the vehicle control device described in the second aspect, the state quantity acquiring devices 3 acquire gradient information indicating a gradient of a traveling path of the vehicle and vehicle speed-related information indicating a vehicle speed which is a speed of the vehicle, and the driving force limiting unit 21 sets an upper limit value of the driving force of the vehicle according to the gradient and the vehicle speed (steps 207 and 208 in FIG. 2) in a case where a gradient equal to or more than a predetermined value is acquired and the vehicle speed is equal to or less than a predetermined value (steps 402 and 403 in FIG. 4) during execution of the acceleration suppression control.

According to this configuration, in a case where the gradient of the traveling path of the vehicle is equal to or more than a predetermined value and the vehicle speed is equal to or less than a predetermined value, the upper limit value of the driving force of the vehicle can be set according to the gradient and the vehicle speed. Therefore, for example, in a traveling path with a large gradient, in a case where the vehicle speed is equal to or less than a predetermined value and an unintentional movement (descending) backward is likely to occur, control of the driving force limitation can be set so as to be switched from the acceleration suppression control to the limited acceleration suppression control with looser limitation. As described above, by executing control of the driving force limitation according to the gradient of the traveling path and the vehicle speed, the driving force can be appropriately controlled so as to prevent descending of the vehicle even in a case where an abnormality has occurred in the state quantity acquiring devices.

Figure 7:
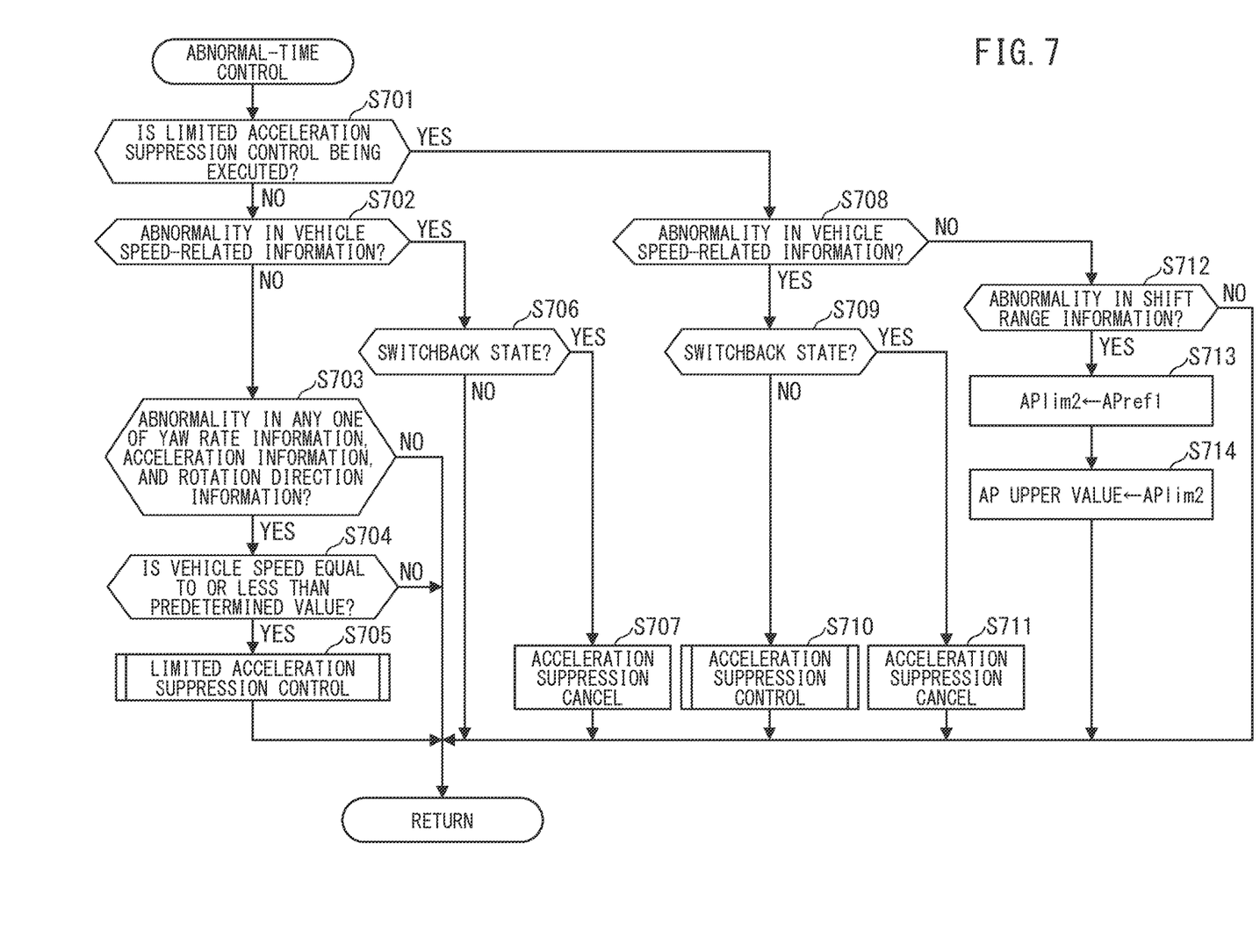
FIG. 7 is a flowchart illustrating an abnormal-time control subroutine.

According to a fifth aspect of the present invention, in the vehicle control device described in any one of the first to third aspects, the state quantity acquiring devices 3 acquire vehicle speed-related information indicating a vehicle speed which is a speed of the vehicle, and the driving force limiting unit 21 stops execution of the limited acceleration suppression control and executes the acceleration suppression control in a case where the abnormality that the vehicle speed-related information cannot be normally acquired has occurred during execution of the limited acceleration suppression control (steps 701, 708, and 710 in FIG. 7).

According to this configuration, in a case where an abnormality that the vehicle speed-related information cannot be normally acquired has occurred during execution of the limited acceleration suppression control, control of the driving force is switched from the limited acceleration suppression control to the acceleration suppression control. As a result, in a case where the current vehicle speed of the vehicle is unknown or reliability of the vehicle speed-related information decreases, the limited acceleration suppression control is shifted to the acceleration suppression control in which the degree of limitation of the driving force is larger, and it is thereby possible to reliably prevent sudden acceleration of the vehicle and to safely continue control of the driving force limitation.

According to a sixth aspect of the present invention. in the vehicle control device described in the fifth aspect, the state quantity acquiring devices 3 further acquire traveling direction information indicating a current traveling direction of the vehicle and shift range information indicating a current shift range of the vehicle, and the driving force limiting unit 21 prohibits execution of the acceleration suppression control and the limited acceleration suppression control (steps 706, 707, 709 and 710 in FIG. 7) when the current traveling direction and a traveling direction based on the current shift range do not coincide with each other in a case where the abnormality that the vehicle speed-related information cannot be normally acquired has occurred (steps 702 and 708 in FIG. 7).

According to this configuration, execution of the acceleration suppression control and the limited acceleration suppression control is prohibited when a reverse traveling state so called switchback traveling in which the current traveling direction of the vehicle and the traveling direction based on the current shift range do not coincide with each other occurs in a case where an abnormality that the vehicle speed-related information cannot be normally acquired has occurred. That is, it is determined that a sudden accelerator pedal operation in a switchback state is not an erroneous operation by the driver but due to an intention to accelerate in a forward traveling direction for canceling the reverse traveling state and returning to a forward traveling state, and suppression of the driving force is temporarily canceled. As a result, the driving force generated by the accelerator pedal operation acts on the vehicle, and the vehicle can quickly get out of the switchback state. Therefore, for example, even in a case where an abnormality that the vehicle speed of the vehicle is unknown has occurred on a traveling path with a large gradient, it is possible to minimize unintentional backward movement (descending) of the vehicle.

According to a seventh aspect of the present invention, in the vehicle control device described in any one of the first to third aspects, the state quantity acquiring devices 3 further acquire at least one of yaw rate information indicating a yaw rate of the vehicle, acceleration information indicating an acceleration in a front-rear direction, and rotation direction information indicating an axle rotation direction, and vehicle speed-related information indicating a vehicle speed which is a speed of the vehicle, and the driving force limiting unit 21 sets an upper limit value of a driving force of the vehicle according to the vehicle speed in a case where the abnormality that at least one of the yaw rate information, the acceleration information, and the rotation direction information cannot be normally acquired has occurred during execution of the acceleration suppression control (steps 703 to 705 in FIG. 7).

According to this configuration, in a case where an abnormality that any one of the yaw rate information, the acceleration information, and the rotation direction information cannot be normally acquired has occurred during execution of the acceleration suppression control, the upper limit value of the driving force is set according to the vehicle speed. As a result, in a case where an abnormality has occurred in acquisition of the yaw rate information or the acceleration information, and the gradient of the traveling path is unknown, or in a case where an abnormality has occurred in acquisition of the rotation direction information, and the traveling direction of the vehicle is unknown, it is possible to perform setting such that the acceleration suppression control is shifted to the limited acceleration suppression control in which the degree of limitation of the driving force is smaller, for example, under a condition that the vehicle speed is equal to or less than a predetermined value. Therefore, for example, even in a case where an abnormality that the gradient or the traveling direction of the vehicle is unknown has occurred on a traveling path with a large gradient, unintentional backward movement (descending) of the vehicle can be appropriately prevented.

According to an eighth aspect of the present invention, in the vehicle control device described in any one of the first to third aspects, the state quantity acquiring devices 3 further acquire shift range information indicating a current shift range of the vehicle, and the driving force limiting unit 21 sets the second limit value APlim2 in the limited acceleration suppression control to a first predetermined value APref1 in a case where the current shift range position is in a D range and sets the second limit value APlim2 to a second predetermined value APref2 smaller than the first predetermined value APref1 in a case where the current shift range position is in an R range (steps 601 to 604 in FIG. 6), and sets the second limit value APlim2 to the first predetermined value APref1 in a case where the abnormality that the shift range information cannot be normally acquired has occurred during execution of the limited acceleration suppression control (steps 712 to 714 in FIG. 7).

According to this configuration, the second limit value, which is the upper limit value of the driving force in the limited acceleration suppression control, is set to the first predetermined value in a case where the current shift position is in the D range, and is set to the second predetermined value smaller than the first predetermined value in a case where the current shift position is in the R range. Therefore, the driving force can be appropriately suppressed according to a shift range.

In addition, in a case where the abnormality that the shift range information cannot be normally acquired has occurred during execution of the limited acceleration suppression control, the second limit value is set to the first predetermined value. As a result, for example, in an emergency situation such as a case where it is necessary to avoid collision with an obstacle or a case where it is necessary to cause the vehicle to escape from a railroad crossing, even if the shift range is unknown or reliability of the shift range information decreases, it is possible to ensure a required driving force, and thus, it is possible to continue control of the driving force limitation while ensuring safety of the vehicle.

According to a ninth aspect of the present invention, in the vehicle control device described in any one of the first to third aspects, further including a notification unit 23 that performs notification to a driver in a case where the abnormality has occurred in at least one of the state quantity acquiring devices 3, in which the notification unit 23 performs the notification in a first mode in a case where the acceleration suppression control is being executed, and performs the notification in a second mode different from the first mode in a case where the limited acceleration suppression control is being executed.

According to this configuration, in a case where an abnormality has occurred in the state quantity acquiring device, the driver is notified of the occurrence of the abnormality. Therefore, when the abnormality occurs, the driver can be made more aware of safe driving. In addition, the mode of the notification during execution of the acceleration suppression control and the mode of the notification during execution of the limited acceleration suppression control are different from each other. Therefore, it is possible to reduce discomfort felt by the driver at the time of switching between these controls.

DETAILED DESCRIPTION

Figure 1:
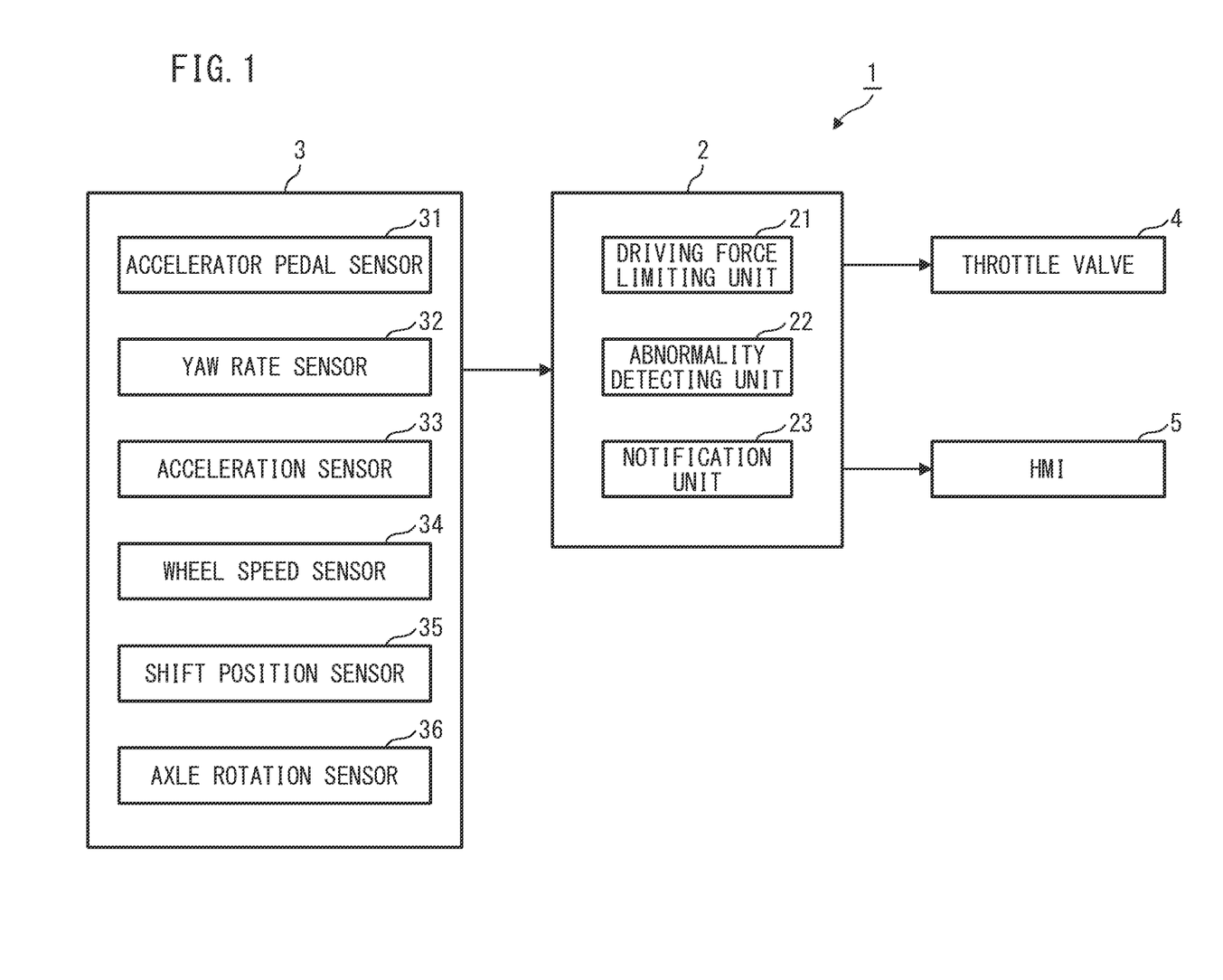
FIG. 1 is a block diagram illustrating a configuration of a vehicle control device according to one embodiment of the present invention.

Hereinafter, preferred embodiments of the present invention will be described in detail with reference to the drawings. FIG. 1 schematically illustrates a configuration of a vehicle control device according to one embodiment of the present invention. A vehicle control device 1 of the present embodiment is mounted on a vehicle such as an automobile, is started when an engine (or a motor) of the vehicle is started, and can execute driving force limitation control for limiting a driving force according to a traveling state of the vehicle.

The vehicle control device 1 includes an electronic control unit (ECU) 2 and a state quantity acquiring devices 3 for detecting various state quantities, and the ECU 2 is constituted by a microcomputer including a CPU, a RAM, a ROM, an I/O interface (none of which is illustrated), and the like. The state quantity acquiring devices 3 including an accelerator pedal sensor 31, a yaw rate sensor 32, an acceleration sensor 33, a wheel speed sensor 34, a shift position sensor 35, an axle rotation sensor 36, and the like is connected to the ECU 2, and detection signals of the sensors are sequentially input to the ECU 2.

The accelerator pedal sensor 31 is a sensor for detecting an accelerator pedal depression amount by the driver, that is, an operation amount, and acquiring an accelerator opening degree AP, an accelerator pedal depression speed $\Delta AP$ calculated as an increase amount of the accelerator pedal depression amount per unit time, and the like. Information on the accelerator pedal operation amount detected by the accelerator pedal sensor 31 is output to the ECU 2, and the ECU 2 calculates and acquires the accelerator opening degree AP and the accelerator pedal depression speed $\Delta AP$ based on the input information on the accelerator pedal operation amount.

The yaw rate sensor 32 outputs a signal according to a yaw rate, which is an angular velocity around the center of gravity of the vehicle when viewed from above, to the ECU 2. The ECU 2 calculates and acquires the yaw rate based on the signal from the yaw rate sensor 32.

The acceleration sensor 33 is a sensor for detecting accelerations, for example, in a front-rear direction, a left-right direction, and an up-down direction of the vehicle. A signal related to the acceleration detected by the acceleration sensor 33 is output to the ECU 2.

The wheel speed sensor 34 is disposed in each wheel of the vehicle, and outputs a pulse signal generated according to rotation of each wheel to the ECU 2. The ECU 2 acquires a wheel speed of each wheel based on the detection signal from each wheel, and averages the wheel speeds to acquire a vehicle speed.

The shift position sensor 35 is a sensor for detecting an operation position of a shift switch or a shift lever (neither of which is illustrated) disposed in the vicinity of a driver's seat in the interior of the vehicle. The shift switch/lever is for selecting various shift range positions, for example, a D range for forward traveling, an R range for backward traveling, a P range for parking, and the like according to its operation position. Information on the shift range that has been detected by the shift position sensor 35 is output to the ECU 2.

The axle rotation sensor 36 is a sensor for detecting a rotation direction or the like of an axle of the vehicle. A signal related to the axle rotation direction detected by the axle rotation sensor 36 is output to the ECU 2.

The ECU 2 reads and executes a program stored in the ROM or the RAM to implement functions of units such as a driving force limiting unit 21, an abnormality detecting unit 22, and a notification unit 23.

As described later, in a case where it is determined that the driver has performed a sudden accelerator pedal operation (hereinafter, referred to as "sudden AP operation") under a predetermined condition, the driving force limiting unit 21 executes driving force limitation control to limit the driving force of the vehicle, for example, by limiting an upper limit value of an opening degree of a throttle valve 4. Note that in a case of an electric vehicle or a hybrid vehicle using a motor as a power source, the driving force of the vehicle can be limited, for example, by limiting an output of the motor instead of limiting the opening degree of the throttle valve.

The abnormality detecting unit 22 monitors operations of the sensors 31 to 36 of the state quantity acquiring devices 3 by a known method and can detect an abnormality that may affect execution of the driving force limitation control, such as a failure of each of the sensors or a failure of a communication system between each of the sensors and the ECU 2, in a case where the abnormality has occurred. As will be described later, the driving force limiting unit 21 changes the content of the limitation of the driving force according to the type of the sensor in which the abnormality has occurred or the state quantity of the vehicle in a case where the abnormality detecting unit 22 detects an abnormality of, for example, the sensor of the state quantity acquiring devices 3.

In a case where the driving force limiting unit 21 determines that the driver has performed the sudden AP operation, the notification unit 23 notifies the driver that the sudden AP operation has been detected, a function of suppressing the driving force is being activated, and the like via various human machine interfaces (HMI) 5. Examples of such a notification via the HMI include displaying a warning with characters on a display disposed on a dashboard, a control panel, or the like, and issuing an attention or a warning sound by audios from an in-vehicle speaker. However, without being limited to these, any type of notification may be given as long as it is possible to give a warning to the driver appropriately.

In addition, as will be described later, the notification unit 23 changes a notification mode according to the type of currently executed driving force limitation (acceleration suppression control or limited acceleration suppression control) such that the driver can recognize switching of the control of the driving force limitation when the control switches. For example, in the present embodiment, a short warning sound (Pip, Pip, Pip) is intermittently emitted when acceleration suppression control described later is being executed, and a long warning sound (P, P, P) is intermittently emitted when limited acceleration suppression control described later is being executed. As a result, discomfort felt by the driver at the time of control switching is reduced, and drivability is improved.

In addition, in a case where the abnormality detecting unit 22 detects an abnormality of, for example, the sensor of the state quantity acquiring devices 3, the notification unit 23 notifies the driver that the abnormality has been detected or that a function of limiting the driving force is not normally operated via the HMI 5.

FIG. 2 illustrates a control process of driving force limitation by the vehicle control device 1 of the present embodiment. The present process is repeatedly executed at every predetermined time interval in a normal driving state of the vehicle. In this process, first, in step 201 (illustrated as "S201". The same applies hereinafter), it is determined whether or not an abnormality has been detected in each sensor of the state quantity acquiring devices 3. If the determination result in step 201 is YES, it is considered that there is a problem in accurate grasping of a vehicle state quantity due to an abnormality of the sensor, and thus this process is ended without proceeding to the subsequent steps. As a result, under a situation where at least some of the state quantities of the vehicle are unknown or reliability of information on the state quantities decreases, occurrence of an unexpected situation is prevented by limiting the driving force, and safety of the vehicle is improved.

Meanwhile, if the determination result in step 201 is NO and no abnormality has been confirmed in each sensor, the process proceeds to the next step 202. In step 202, it is determined whether or not the sudden AP operation has been performed by the driver.

Figure 3:
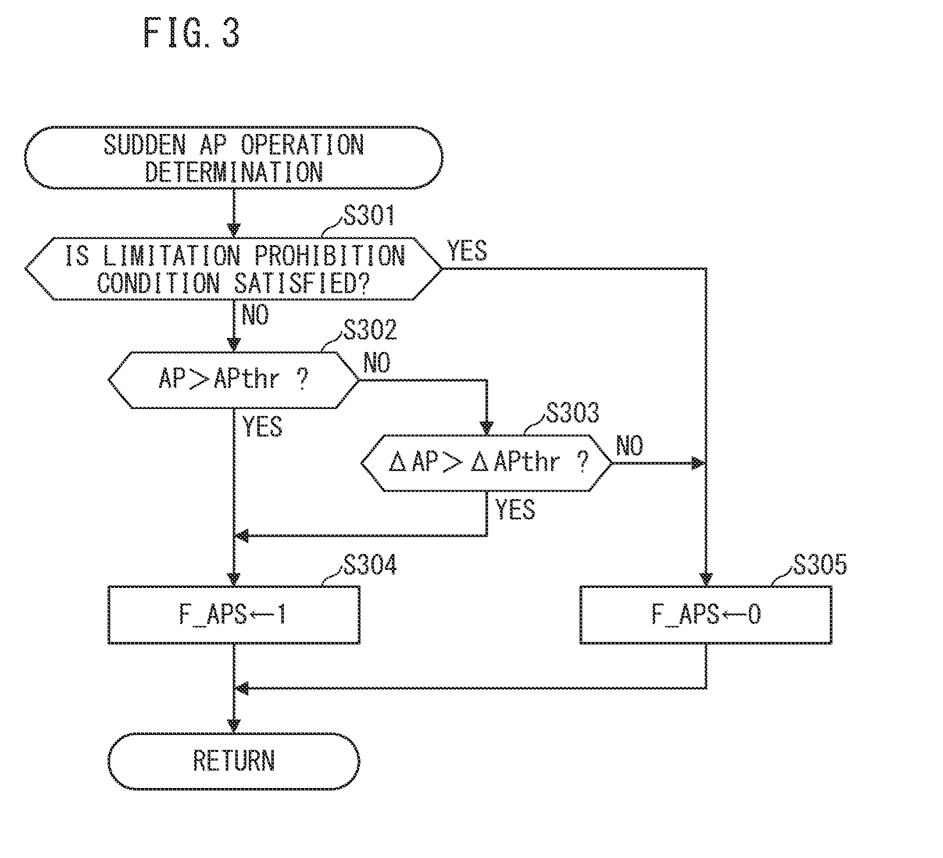
FIG. 3 is a flowchart illustrating a sudden accelerator pedal operation determining subroutine.

FIG. 3 illustrates a subroutine of the sudden AP operation determination. First, in step 301, it is determined whether or not a predetermined limitation prohibition condition is satisfied. The limitation prohibition condition defines a traveling state in which limitation of the driving force is considered to be unnecessary.

Such a limitation prohibition condition can be appropriately changed according to design, and for example, a vehicle speed as a condition may be different between a case where the shift position is in the D range and a case where the shift position is in the R range. In addition, it is also possible to set the limitation prohibition condition in consideration of various conditions such as a depression state of a brake pedal, a lighting state of a blinker, and a gradient of a traveling path, and to execute limitation of the driving force only under a traveling condition in which a possibility that the sudden AP operation is due to an erroneous operation is higher.

If the determination result in step 301 is YES and a predetermined limitation prohibition condition is satisfied, the process proceeds to step 305, a value of a flag F_APS is set to "0", and this process is ended. Note that the flag F_APS is a flag indicating success or failure of the sudden AP operation determination, and is set to "1" in a case where it is determined that the sudden AP operation has been performed, and is set to "0" otherwise.

Meanwhile, if the determination result in step 301 is NO and the predetermined limitation prohibition condition is not satisfied, the process proceeds to step 302. In step 302, it is determined whether or not the current accelerator opening degree AP, which increases or decreases based on an accelerator pedal operation amount, exceeds a predetermined threshold opening degree APthr. The threshold opening degree APthr is set as a large accelerator opening degree sufficient to determine that the sudden AP operation has been performed.

If the determination result in step 302 is YES, it is determined that the sudden AP operation has been performed, the process proceeds to step 304, a value of the flag F_APS is set to "1", and this process is ended. Meanwhile, if the determination result in step 302 is NO, subsequently in step 303, it is determined whether or not a depression speed $\Delta AP$ calculated as an increase amount of an accelerator pedal depression amount per unit time exceeds a predetermined threshold speed $\Delta APthr$. The threshold speed $\Delta APthr$ is set as a large speed value sufficient to determine that the sudden AP operation has been performed.

If the determination result in step 303 is YES, it is determined that the sudden AP operation has been performed, the process proceeds to step 304, a value of the flag F_APS is set to "1", and this process is ended. Meanwhile, if the determination result in step 303 is NO, the process proceeds to step 305, a value of the flag F_APS is set to "0", and this process is ended.

Returning to FIG. 2, after the sudden AP operation determination in step 202 is ended, the process proceeds to step 203. In step 203, it is determined whether or not a value of the flag F_APS is set to "1". If the determination result is NO, it is determined that the sudden AP operation has not been performed and there is no need to limit the driving force, and this process is ended.

Meanwhile, if the determination result in step 203 is YES and it is determined that the sudden AP operation has been performed, the process proceeds to the next step 204. In step 204, in order to prevent the vehicle from suddenly starting, acceleration suppression control for largely limiting the accelerator opening degree AP, that is, an upper limit value of the opening degree of the throttle valve 4 is executed.

Figure 4:
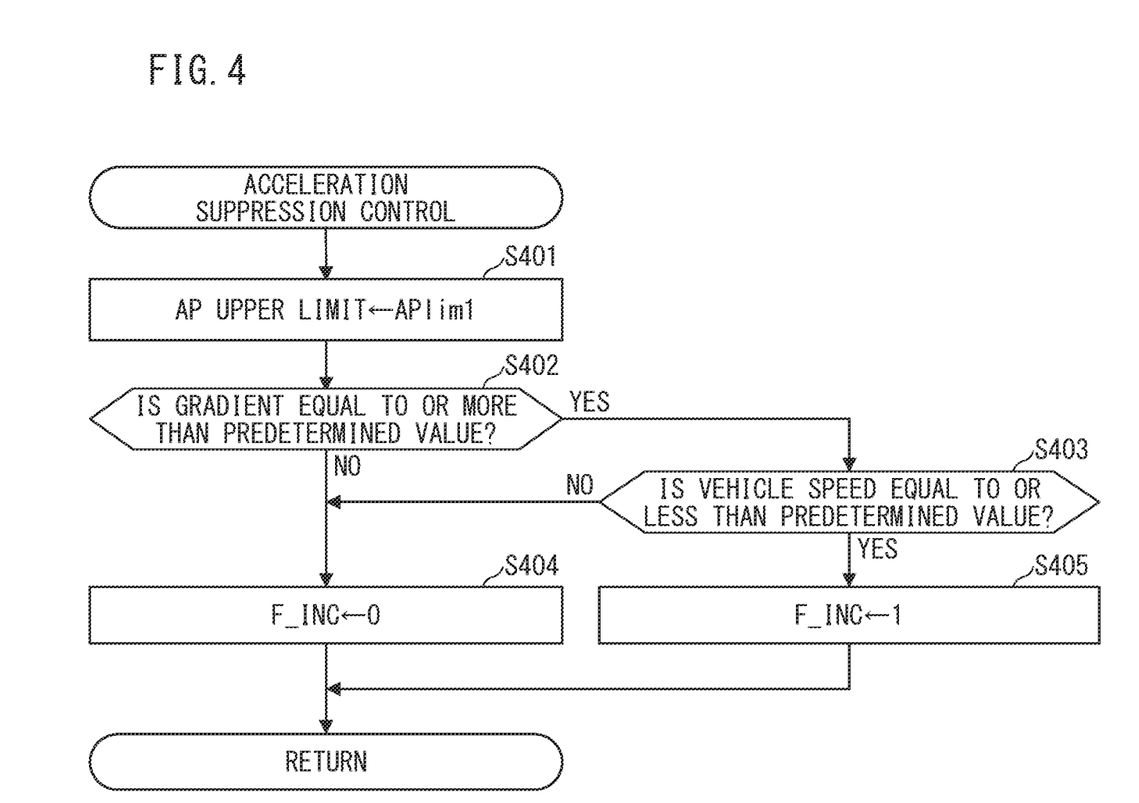
FIG. 4 is a flowchart illustrating an acceleration suppression control subroutine.

FIG. 4 illustrates a subroutine of the acceleration suppression control. First, in step 401, an upper limit value of the accelerator opening degree AP is set to a first limit value APlim1. The first limit value APlim1 is set as a value that largely limits the upper limit value of the accelerator opening degree AP in order to reliably prevent sudden start. In the present embodiment, for example, the upper limit value of the accelerator opening degree AP is set to approximately 0%. Therefore, in this case, even if the driver strongly depresses an accelerator pedal, only a driving force corresponding to a creep phenomenon acts on the vehicle.

In subsequent steps 402 to 405, it is determined whether or not there is a high possibility that the vehicle unintentionally moves backward, that is, the vehicle descends based on a gradient of a traveling path of the vehicle and a current vehicle speed. In step 402, yaw rate information and acceleration information are acquired from the yaw rate sensor 32 and the acceleration sensor 33, the current gradient of the traveling path is calculated, and then it is determined whether or not the gradient is equal to or more than a predetermined value. Here, the gradient equal to or more than a predetermined value is set as a gradient at which the vehicle cannot be moved forward by a driving force acting on the vehicle in a case where the upper limit value of the accelerator opening degree AP is set to the first limit value APlim1 and descending of the vehicle can occur.

If the determination result in step 402 is NO, that is, if it is determined that the current gradient of the traveling path is not so large as to induce descending of the vehicle, the process proceeds to step 404, a value of a flag F_INC is set to "0", and this process is ended. The flag F_INC is a flag indicating whether or not the gradient of the traveling path can induce descending of the vehicle, and is set to "1" in a case where it is determined that descending can be induced, and is set to "0" otherwise.

Meanwhile, if the determination result in step 402 is YES, that is, if it is determined that the current gradient of the traveling path is so large as to induce descending of the vehicle, the process subsequently proceeds to step 403. In step 403, it is determined whether or not the current vehicle speed is equal to or less than a predetermined value. Here, the vehicle speed equal to or less than a predetermined value is set as a speed at which it can be determined that the current driving force is not sufficient to move the vehicle on the gradient path forward and the vehicle has started stalling.

If the determination result in step 403 is NO, that is, if it is determined that the current vehicle speed does not indicate stalling of the vehicle, the process proceeds to step 404, a value of the flag F_INC is set to "0", and this process is ended. Meanwhile, if the determination result in step 403 is YES and it is determined that the current vehicle speed indicates stalling of the vehicle, the process proceeds to step 405, a value of the flag F_INC is set to "1", and this process is ended.

Returning to FIG. 2 again, after the acceleration suppression control in step 204 is ended, the process proceeds to step 205. In step 205, it is determined whether the sudden AP operation by the driver confirmed in the sudden AP operation determination in step 202 is due to an erroneous operation or due to an acceleration request by the driver.

Figure 5:
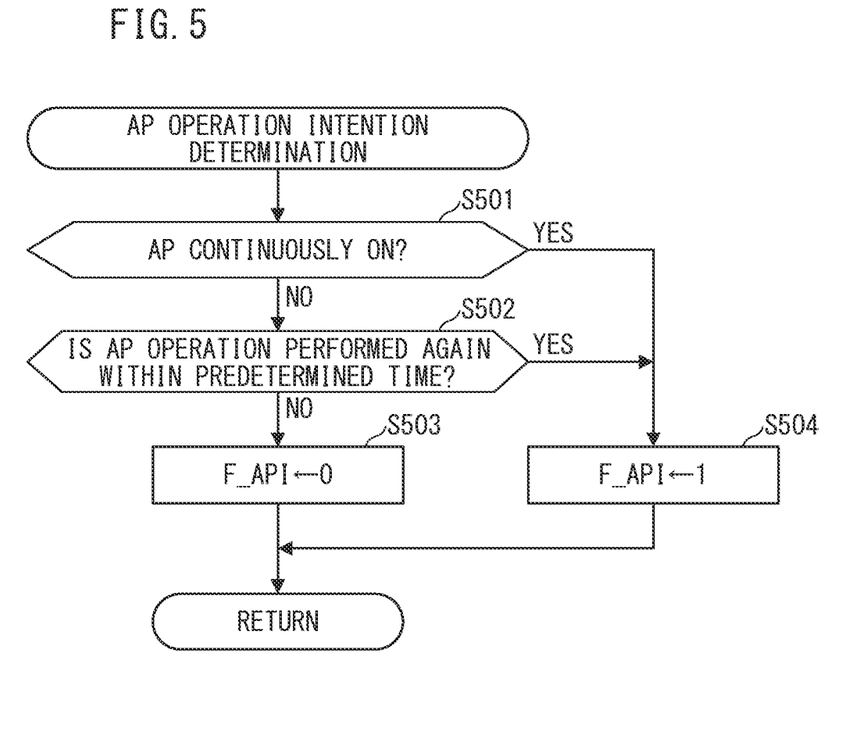
FIG. 5 is a flowchart illustrating an accelerator pedal operation intention determining subroutine.

FIG. 5 illustrates a subroutine of accelerator pedal operation intention determination (hereinafter, referred to as "AP operation intention determination"). First, in step 501, it is determined whether or not depression of an accelerator pedal confirmed as the sudden AP operation by the driver continues for a predetermined time or more. Here, the predetermined time used for the determination is set to a time during which or more it can be determined that the accelerator pedal is rarely continuously depressed if the confirmed sudden AP operation is due to an erroneous operation. The predetermined time can be set to, for example, about several seconds.

If the determination result in step 501 is YES, it is determined that there is a possibility that the confirmed sudden AP operation is due to an acceleration request by the driver, the process proceeds to step 504, a value of a flag F_API is set to "1", and this process is ended. The flag F_API is a flag indicating whether or not there is a possibility that the sudden AP operation is due to an acceleration request by the driver, and is set to "1" in a case where it is determined that there is a possibility that the sudden AP operation is due to the acceleration request, and is set to "0" otherwise.

Meanwhile, if the determination result in step 501 is NO, the process subsequently proceeds to step 502. In step 502, after the depression of the accelerator pedal confirmed as the sudden AP operation by the driver is loosened to a predetermined value, it is determined again whether or not the sudden AP operation has been performed within a predetermined time. Here, the predetermined value used for the determination is a value of such a small depression amount as to be able to determine that the depression of the accelerator pedal has been substantially canceled. In addition, the predetermined time used for the determination is set to a time during which it can be determined that the sudden AP operation due to an erroneous operation is rarely performed again if the confirmed sudden AP operation is due to the erroneous operation. The predetermined time can be set to, for example, about several seconds.

If the determination result in step 502 is YES, it is determined that there is a possibility that the confirmed sudden AP operation is due to an acceleration request by the driver, the process proceeds to step 504, a value of the flag F_API is set to "1", and this process is ended. Meanwhile, if the determination result in step 502 is NO, it is determined that the possibility that the confirmed sudden AP operation is due to an acceleration request by the driver is low, the process proceeds to step 503, a value of the flag F_API is set to "0", and this process is ended.

Returning to FIG. 2 again, after the AP operation intention determination in step 205 is ended, the process proceeds to step 206. In step 206, it is determined whether or not a value of the flag F_API is set to "1". If the determination result is YES and it is determined that there is a possibility that the confirmed sudden AP operation is due to an acceleration request by the driver, in the next step 208, limited acceleration suppression control for setting an upper limit value of the accelerator opening degree AP to a second limit value APlim2 larger (that is, a looser limit value) than the first limit value APlim1 is executed. Details of the limited acceleration suppression control will be described later.

Meanwhile, if the determination result in step 206 is NO and it is determined that the possibility that the confirmed sudden AP operation is due to an acceleration request by the driver is low, the process subsequently proceeds to step 207. In step 207, it is determined whether or not a value of the flag F_INC is set to "1". If the determination result is YES and it is determined that the current gradient of the traveling path can induce descending of the vehicle, the process proceeds to step 208 and limited acceleration suppression control is executed. Meanwhile, if the determination result in step 207 is NO and it is determined that the current gradient of the traveling path cannot induce descending of the vehicle, the limited acceleration suppression control is not executed, and the process proceeds to the next step 209.

Figure 6:
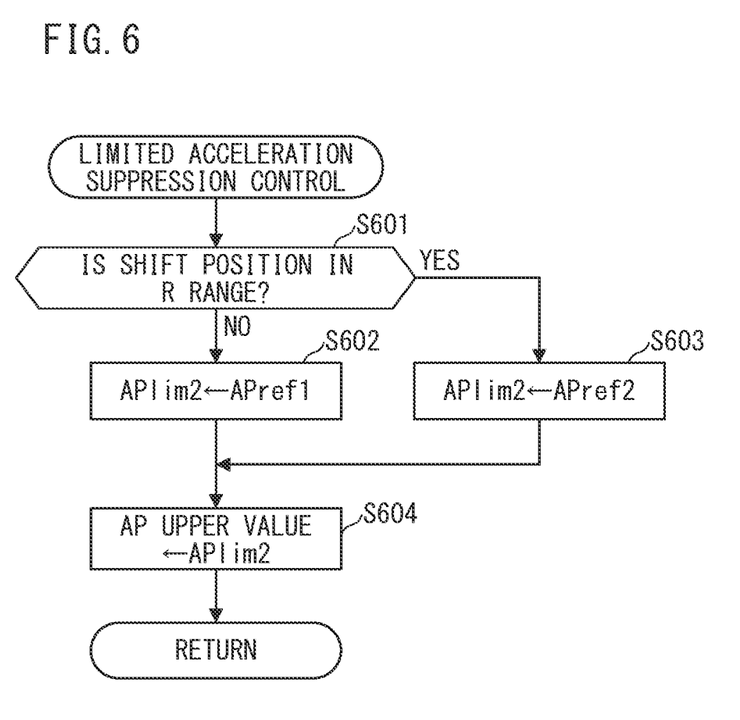
FIG. 6 is a flowchart illustrating a limited acceleration suppression control subroutine.

FIG. 6 illustrates a subroutine of the limited acceleration suppression control. First, in step 601, it is determined whether or not the current shift position is in the R range by referring to a detection value of the shift position sensor 35. If the determination result is NO and the current shift position is not in the R range, the process proceeds to step 602. In step 602, a value of the second limit value APlim2 is set to the first predetermined value APref1, and the process proceeds to the next step 604.

Meanwhile, if the determination result in step 601 is YES and the current shift position is in the R range, the process proceeds to step 603. In step 603, a value of the second limit value APlim2 is set to a second predetermined value APref2 smaller than the first predetermined value APref1, and the process proceeds to the next step 604.

In step 604, an upper limit value of the accelerator opening degree AP is set to the second limit value APlim2, and this process is ended. The second limit value APlim2 is set to either the first predetermined value APref1 or the second predetermined value APref2 according to the current shift position.

The first predetermined value APref1 is an upper limit value of the accelerator opening degree AP set in a case where the shift position is in an range other than the R range, and is a value set for the purpose of achieving both avoidance of danger due to sudden start and a minimum driving force according to an acceleration request in consideration of both a possibility that the confirmed sudden AP operation is an erroneous operation by the driver and a possibility that the confirmed sudden AP operation is due to an acceleration request. For example, the first predetermined value APref1 may be set such that a vehicle speed at which severe damage is unlikely to occur at the time of collision is set as an upper limit vehicle speed, and a driving force is provided within a range in which the vehicle speed does not exceed the upper limit vehicle speed.

In addition, the second predetermined value APref2 is an upper limit value of the accelerator opening degree AP set in a case where the shift position is in the R range, and the purpose of setting the second predetermined value APref2 is similar to that of the first predetermined value APref1. However, in a case where the vehicle is moved backward, a risk when the vehicle speed is high is larger than that in a case where the vehicle is moved forward. Therefore, the second predetermined value APref2 is set to a value smaller than the first predetermined value APref1. Similarly to the first predetermined value APref1, the second predetermined value APref2 may also be set such that a vehicle speed at which severe damage is unlikely to occur at the time of collision is set as an upper limit vehicle speed, and a driving force is provided within a range in which the vehicle speed does not exceed the upper limit vehicle speed.

In addition, in a case where the second limit value APlim2 is set to either the first predetermined value APref1 or the second predetermined value APref2, the second limit value APlim2 is a value larger than the first limit value APlim1 set as the upper limit value of the accelerator opening degree AP in the acceleration suppression control. Therefore, even in a situation where there is a high possibility that descending of the vehicle occurs due to the gradient of the traveling path, it is possible to obtain a sufficient driving force to prevent the descending.

Returning to FIG. 2 again, after the limited acceleration suppression control in step 208 is ended, the process proceeds to step 209. In step 209, similarly to step 201, it is determined whether or not an abnormality has been detected in each sensor of the state quantity acquiring devices 3. If the determination result in step 209 is YES, it is considered that there is a problem in accurate grasping of a vehicle state quantity due to an abnormality of the sensor. Therefore, in the next step 210, abnormal-time control for safely continuing control of a driving force is executed. Meanwhile, if the determination result in step 209 is NO and no abnormality has been confirmed in each sensor, step 210 is skipped and the process proceeds to the next step 211.

FIG. 7 illustrates a subroutine of the abnormal-time control. First, in step 701, it is determined whether or not the currently executed control is the limited acceleration suppression control. If the determination result is NO and the currently executed control is the acceleration suppression control, the process proceeds to step 702.

In step 702, it is determined whether or not the detected abnormality is an abnormality related to vehicle speed-related information. If the determination result is YES, the process proceeds to step 706. In step 706, it is determined whether or not the vehicle is in a switchback state in which the current traveling direction of the vehicle and a traveling direction based on the current shift range do not coincide with each other. If the determination result is NO and the vehicle is not in the switchback state, it is determined that there is no abnormal-time process to be performed in particular, and this process is ended.

Meanwhile, if the determination result in step 706 is YES and the vehicle is in the switchback state, in step 707, the currently executed acceleration suppression control is canceled and this process is ended. As described for steps 402 and 403 in FIG. 4, it is assumed that descending of the vehicle may occur in a case where the gradient is equal to or more than a predetermined value and the vehicle speed is equal to or less than a predetermined value during execution of the acceleration suppression control, and the acceleration suppression control is switched to the limited acceleration suppression control to cope with this. However, in a case where an abnormality related to the vehicle speed-related information has occurred, an accurate vehicle speed cannot be detected, and there is a risk that the possibility of descending of the vehicle cannot be appropriately determined.

In order to cope with such a problem, in a case where an abnormality has occurred in acquisition of the vehicle speed-related information, it is determined whether or not the switchback state has occurred by referring to the detection values of the shift position sensor 35 and the axle rotation sensor 36. In a case where the switchback state has occurred, there is a high possibility that descending of the vehicle has occurred. Therefore, by canceling the currently executed acceleration suppression control, it is possible to quickly get out of the switchback state due to descending by the driver's accelerator pedal operation.

Next, if the determination result in step 702 is NO and the detected abnormality is not an abnormality related to the vehicle speed-related information, the process proceeds to step 703. In step 703, it is determined whether or not the detected abnormality relates to any one of the yaw rate information, the acceleration information, and the rotation direction information. If the determination result is NO, it is determined that there is no abnormal-time process to be performed in particular, and this process is ended.

Meanwhile, if the determination result in step 703 is YES, it is considered that there is a problem in acquisition of either gradient information or traveling direction information due to the abnormality that has occurred, and thus there is a possibility that the control for preventing descending of the vehicle does not normally function based on these pieces of information. Therefore, in subsequent steps 704 and 705, a process for preventing descending of the vehicle is performed.

In step 704, it is determined whether or not the current vehicle speed is equal to or less than a predetermined value. Here, the vehicle speed equal to or less than a predetermined value is set as a speed at which it can be determined that the vehicle has started stalling in a case where the gradient of the traveling path is so large as to be able to induce descending of the vehicle. If the determination result is NO, it is determined that there is a low possibility that descending has occurred and there is no abnormal-time process to be performed in particular, and this process is ended.

Meanwhile, if the determination result in step 704 is YES, it is determined that there is a high possibility that descending of the vehicle has occurred, and in step 705, the currently executed acceleration suppression control is ended and shifted to the limited acceleration suppression control, and this process is ended. As a result, even in a situation where there is a high possibility that descending of the vehicle occurs due to the gradient of the traveling path, it is possible to obtain a sufficient driving force for minimizing the descending.

Next, if the determination result in step 701 is YES and the currently executed control is the limited acceleration suppression control, the process proceeds to step 708. In step 708, it is determined whether or not the detected abnormality is an abnormality related to vehicle speed-related information. If the determination result is YES, the process proceeds to step 709.

In step 709, it is determined whether or not the vehicle is in a switchback state in which the current traveling direction of the vehicle and a traveling direction based on the current shift range do not coincide with each other. If the determination result is YES, in step 711, the currently executed limited acceleration suppression control is canceled, and this process is ended. A reason for canceling the limited acceleration suppression control being executed when the vehicle is in the switchback state is to minimize descending of the vehicle, similarly to the reason for performing the process in step 707.

Meanwhile, if the determination result in step 709 is NO, the process proceeds to step 710, and the currently executed limited acceleration suppression control is ended and shifted to acceleration suppression control, and this process is ended. That is, in a case where it can be determined that there is a problem in acquisition of the vehicle speed-related information due to the abnormality that has occurred, the vehicle is not in the switchback state, and the possibility of occurrence of descending is low, emphasis is placed on preventing sudden acceleration and preventing the vehicle speed from becoming excessive, and the control is switched to the acceleration suppression control that limits a driving force more largely.

Next, if the determination result in step 708 is NO and the detected abnormality is not an abnormality related to the vehicle speed-related information, the process proceeds to step 712. In step 712, it is determined whether or not the detected abnormality is an abnormality related to shift range information. If the determination result is NO, it is determined that there is no abnormal-time process to be performed in particular, and this process is ended.

Meanwhile, in a case where the determination result in step 712 is YES and an abnormality related to the shift range information has occurred, a possibility that the processes in steps 601 to 603 of FIG. 6 performed when the limited acceleration suppression control is executed, that is, the process of setting a value of the second limit value APlim2 to either the first predetermined value APref1 or the second predetermined value APref2 according to the current shift position is not normally performed is conceivable. Therefore, in subsequent steps 713 and 714, a process for ensuring a driving force in an emergency is performed.

In step 713, similarly to step 602 in FIG. 6, a value of the second limit value APlim2 is set to the first predetermined value APref1, and the process proceeds to step 714. In step 714, similarly to step 604 in FIG. 6, an upper limit value of the accelerator opening degree AP is set to the second limit value APlim2, and this process is ended. With such a process, for example, in an emergency situation such as a case where it is necessary to avoid collision with an obstacle or a case where it is necessary to cause the vehicle to escape from a railroad crossing, even if there is a problem in acquisition of the shift range information, the required driving force can be ensured.

Returning to FIG. 2 again, after the abnormal-time control in step 210 ends, the process proceeds to step 211. In step 211, various notifications are performed to the driver via various HMIs included in the vehicle. This notification includes "detection of the sudden AP operation", "activation of a function of suppressing a driving force", "occurrence of an abnormality", and the like. In the present embodiment, for example, a message such as "Sudden acceleration suppressing function is being activated", "Please return the accelerator" "Sudden acceleration suppressing function is abnormal", or "System is not activated" is displayed appropriately on a display disposed in a control panel, and a warning sound is also emitted from an in-vehicle speaker to perform a notification to the driver.

In addition, in the present embodiment, by changing a mode of the warning sound depending on whether the control being executed is the acceleration suppression control or the limited acceleration suppression control, when the control of the driving force limitation is switched, the driver can recognize the switching. For example, in the present embodiment, a short warning sound (Pip, Pip, Pip) is intermittently emitted when the acceleration suppression control is being executed, and a long warning sound (P, P, P) is intermittently emitted when the limited acceleration suppression control is being executed. As a result, discomfort felt by the driver at the time of control switching is reduced, and drivability is improved.

Subsequently, in step 212, as an end condition of the acceleration suppression control or the limited acceleration suppression control, it is determined whether or not the depression of the accelerator pedal confirmed as the sudden AP operation by the driver is loosened to a predetermined value. Here, the predetermined value used for the determination is a value of such a small depression amount as to be able to determine that the depression of the accelerator pedal has been substantially canceled. If the determination result is NO and the sudden AP operation is still continued, the process returns to step 205, and the process is repeated until cancelation of the sudden AP operation is confirmed.

Meanwhile, if the determination result in step 212 is YES and it is determined that the depression of the accelerator pedal is loosened to a predetermined value and the sudden AP operation is canceled, the process proceeds to step 213. In step 213, the acceleration suppression control or the limited acceleration suppression control being executed is ended, and the notification to the driver is ended. In addition, at the same time, values of various flags are reset to "0", and this process is ended. Note that in order to prevent the vehicle from suddenly accelerating immediately after the limitation of the driving force is canceled, the limitation of the driving force may be gradually loosened over a certain period of time.

As described above, according to the vehicle control device 1 of the present embodiment, in a case where an abnormality has occurred in the state quantity acquiring devices 3 during execution of the acceleration suppression control or the limited acceleration suppression control, an upper limit value of a driving force of the vehicle is switched according to the type of each of the sensors 31 to 36 in which the abnormality has occurred. Therefore, it is possible to control the driving force of the vehicle more safely and appropriately according to the type and content of the abnormality as compared with a case where limitation of the driving force is immediately canceled at the time of occurrence of the abnormality or control being executed is simply maintained. Therefore, it is possible to safely continue control of the driving force limitation even in a case where an abnormality has occurred.

In addition, even in a case where an abnormality has occurred in the state quantity acquiring devices 3 during execution of the acceleration suppression control or the limited acceleration suppression control, execution of the acceleration suppression control and the limited acceleration suppression control is prohibited after the sudden AP operation is canceled once. Therefore, it is possible to avoid occurrence of an unexpected situation by limiting the driving force under a situation where some of the state quantities of the vehicle are unknown or reliability of information decreases, and to improve safety of the vehicle.

In addition, when the acceleration suppression control is executed, the acceleration suppression control is switched to the limited acceleration suppression control according to the gradient of the traveling path and the vehicle speed, and therefore descending of the vehicle can be appropriately prevented.

In addition, switching to the acceleration suppression control is performed in a case where an abnormality related to vehicle speed-related information has occurred during execution of the limited acceleration suppression control, and therefore it is possible to reliably prevent sudden acceleration of the vehicle even in a case where an accurate vehicle speed cannot be acquired.

In addition, in a case where an abnormality related to the vehicle speed-related information has occurred, execution of the acceleration suppression control and the limited acceleration suppression control is temporarily prohibited when the vehicle is in a switchback state. Therefore, even if the switchback state due to descending of the vehicle occurs due to a failure to acquire an accurate vehicle speed, the vehicle can quickly get out of the switchback state.

In addition, in a case where an abnormality related to any one of the yaw rate information, the acceleration information, and the rotation direction information has occurred during execution of the acceleration suppression control, switching to the limited acceleration suppression control is performed on a condition that the vehicle speed is equal to or less than a predetermined value. Therefore, even in a case where accurate gradient information and traveling direction information cannot be acquired, descending of the vehicle can be appropriately prevented.

In addition, in a case where an abnormality related to shift range information has occurred during execution of the limited acceleration suppression control, a value of the second limit value APlim2 is set to the first predetermined value APref1. Therefore, even in a case where accurate shift range information cannot be acquired in an emergency such as avoidance of collision with an obstacle or escape from a railroad crossing, it is possible to ensure a required driving force and to avoid danger.

In addition, in a case where a sensor abnormality has occurred, the driver is notified of the occurrence of the abnormality. Therefore, when the abnormality occurs, the driver can be made more aware of safe driving. In addition, the mode of the notification during execution of the acceleration suppression control and the mode of the notification during execution of the limited acceleration suppression control are different from each other. Therefore, it is possible to reduce discomfort felt by the driver at the time of switching between these controls.

Note that the present invention is not limited to the embodiment that has been described, and can be implemented in various modes. In addition, the detailed configuration can be changed appropriately within the scope of the gist of the present invention.

What is claimed is:

1. A vehicle control device comprising:
an accelerator pedal sensor that detects an accelerator pedal operation of a vehicle and acquires an accelerator opening degree or an accelerator pedal depression speed;
a plurality of sensors that acquires a vehicle state quantity indicating various state quantities of the vehicle;
an ECU that limits a driving force of the vehicle based on the accelerator pedal operation and the vehicle state quantity; and
an abnormality detecting unit that determines that at least one abnormality exists in one or more of the vehicle state quantities acquired, wherein
the ECU
executes acceleration suppression control for setting an upper limit value of the driving force of the vehicle to a predetermined first limit value in a case where the accelerator opening degree exceeds a predetermined threshold opening degree or in a case where the accelerator pedal depression speed exceeds a predetermined threshold speed,
executes limited acceleration suppression control for setting the upper limit value of the driving force of the vehicle to a second limit value larger than the first limit value in a case where the accelerator pedal is continuously depressed for a predetermined time or more or in a case where the accelerator opening degree exceeds the threshold opening degree or the accelerator pedal depression speed exceeds the threshold speed within a predetermined time after the depression of the accelerator pedal is returned to a predetermined value, during execution of the acceleration suppression control, and
switches the upper limit value of the driving force of the vehicle according to at least one of the plurality of sensors in which the at least one abnormality exists in the one or more of the vehicle state quantities acquired until the depression of the accelerator pedal is returned to the predetermined value in a case where the abnormality has occurred in at least one of the sensors during execution of the acceleration suppression control or the limited acceleration suppression control.

2. The vehicle control device according to claim 1, wherein in a case where an abnormality has occurred in at least one of the sensors during execution of the acceleration suppression control or the limited acceleration suppression control, the ECU prohibits execution of the acceleration suppression control and the limited acceleration suppression control after depression of the accelerator pedal is returned to the predetermined value.

3. The vehicle control device according to claim 2, wherein
the sensors acquire gradient information indicating a gradient of a traveling path of the vehicle and vehicle speed-related information indicating a vehicle speed which is a speed of the vehicle, and
the ECU sets an upper limit value of the driving force of the vehicle according to the gradient and the vehicle speed in a case where a gradient equal to or more than a predetermined value is acquired and the vehicle speed is equal to or less than a predetermined value during execution of the acceleration suppression control.

4. The vehicle control device according to claim 1, wherein
the sensors acquire gradient information indicating a gradient of a traveling path of the vehicle and vehicle speed-related information indicating a vehicle speed which is a speed of the vehicle, and
the ECU sets an upper limit value of the driving force of the vehicle according to the gradient and the vehicle speed in a case where a gradient equal to or more than a predetermined value is acquired and the vehicle speed is equal to or less than a predetermined value during execution of the acceleration suppression control.

5. The vehicle control device according to claim 1, wherein
the sensors acquire vehicle speed-related information indicating a vehicle speed which is a speed of the vehicle, and
the ECU stops execution of the limited acceleration suppression control and executes the acceleration suppression control in a case where the abnormality that the vehicle speed-related information cannot be normally acquired has occurred during execution of the limited acceleration suppression control.

6. The vehicle control device according to claim 5, wherein
the sensors further acquire traveling direction information indicating a current traveling direction of the vehicle and shift range information indicating a current shift range of the vehicle, and
the ECU prohibits execution of the acceleration suppression control and the limited acceleration suppression control when the current traveling direction and a traveling direction based on the current shift range do not coincide with each other in a case where the abnormality that the vehicle speed-related information cannot be normally acquired has occurred.

7. The vehicle control device according to claim 1, wherein
the sensors further acquire at least one of yaw rate information indicating a yaw rate of the vehicle, acceleration information indicating an acceleration in a front-rear direction, and rotation direction information indicating an axle rotation direction, and vehicle speed-related information indicating a vehicle speed which is a speed of the vehicle, and
the ECU sets an upper limit value of a driving force of the vehicle according to the vehicle speed in a case where the abnormality that at least one of the yaw rate information, the acceleration information, and the rotation direction information cannot be normally acquired has occurred during execution of the acceleration suppression control.

8. The vehicle control device according to claim 1, wherein
the sensors further acquire shift range information indicating a current shift range of the vehicle, and
the ECU
sets the second limit value in the limited acceleration suppression control to a first predetermined value in a case where the current shift range position is in a D range and sets the second limit value to a second predetermined value smaller than the first predetermined value in a case where the current shift range position is in an R range, and
sets the second limit value to the first predetermined value in a case where the abnormality that the shift range information cannot be normally acquired has occurred during execution of the limited acceleration suppression control.

9. The vehicle control device according to claim 1, wherein
the ECU performs notification to a driver in a case where the abnormality has occurred in at least one of the sensors, and
the ECU performs the notification in a first mode in a case where the acceleration suppression control is being executed, and performs the notification in a second mode different from the first mode in a case where the limited acceleration suppression control is being executed.

* * * * *